US007976885B2

(12) United States Patent
Pulsfus et al.

(10) Patent No.: US 7,976,885 B2
(45) Date of Patent: Jul. 12, 2011

(54) ANTI-MICROBIAL INJECTION FOR WEB PACKAGING PASTEURIZATION SYSTEM

(75) Inventors: Seth T. Pulsfus, Poynette, WI (US); Lynn Amyx, Lodi, WI (US); Bryan J. Lemmenes, Stoughton, WI (US)

(73) Assignee: Alkar-RapidPak-MP Equipment, Inc., Lodi, WI (US)

( * ) Notice: Subject to any disclaimer, the term of this patent is extended or adjusted under 35 U.S.C. 154(b) by 379 days.

(21) Appl. No.: 11/877,426

(22) Filed: Oct. 23, 2007

(65) Prior Publication Data
US 2009/0104327 A1 Apr. 23, 2009

(51) Int. Cl.
*B65B 55/18* (2006.01)
(52) U.S. Cl. ........ 426/316; 426/320; 426/326; 426/511; 426/521; 426/532; 53/433; 53/511
(58) Field of Classification Search .......... 426/326, 426/511, 521, 321, 324, 325, 407, 310, 312, 426/316, 320; 53/127, 111 R, 431, 425, 53/432, 517, 433, 511; 99/486, 516, 487, 99/532, 534, 473
See application file for complete search history.

(56) References Cited

U.S. PATENT DOCUMENTS

| 1,437,907 | A | * | 12/1922 | Patterson .................. 53/111 RC |
|---|---|---|---|---|
| 2,364,049 | A | | 12/1944 | Bensel |
| 2,779,681 | A | | 1/1957 | Sell et al. |
| 3,597,228 | A | | 8/1971 | Jeppson et al. |
| 3,843,806 | A | | 10/1974 | Kishpaugh et al. |
| 3,889,009 | A | | 6/1975 | Lipoma |
| 3,906,115 | A | | 9/1975 | Jeppson |
| 3,961,090 | A | | 6/1976 | Weiner et al. |
| 3,966,980 | A | | 6/1976 | McGuckian |
| 3,992,850 | A | | 11/1976 | Vetter |
| 4,045,939 | A | | 9/1977 | Baumstingl |
| 4,391,862 | A | | 7/1983 | Bornstein et al. |
| 4,448,792 | A | | 5/1984 | Schirmer |
| 4,533,515 | A | | 8/1985 | Witter et al. |

(Continued)

FOREIGN PATENT DOCUMENTS
AU 2003227294 A1 4/2004
(Continued)

OTHER PUBLICATIONS

Merriam Webster Dictionary, definition of Spray, p. 1208, No month 2004.*

(Continued)

*Primary Examiner* — C. Sayala
*Assistant Examiner* — Walter Moore
(74) *Attorney, Agent, or Firm* — Andrus, Sceales, Starke & Sawall, LLP

(57) ABSTRACT

Systems and methods for antimicrobial injection in a web packaging pasteurization system are provided. A pressurized mixture of pasteurizing medium and at least one antimicrobial agent is applied to the surfaces of a food product. According to a preferred embodiment, the at least one microbial agent is injected into and thereby mixed with the pressurized supply of pasteurizing steam prior to its discharge into a pressurized chamber and application to the food surfaces. Preferably, the mixture is introduced into the pressurized chamber at an inflow rate and vented from the chamber at an outflow rate that is slower than the inflow rate such that the pressure in the chamber increases to increase the temperature of the mixture to an effective temperature for killing bacteria.

5 Claims, 6 Drawing Sheets

U.S. PATENT DOCUMENTS

| | | |
|---|---|---|
| 4,602,262 A | 7/1986 | Milligan |
| 4,606,262 A | 8/1986 | Robinson, Jr. et al. |
| 4,656,042 A | 4/1987 | Risler |
| 4,737,373 A | 4/1988 | Forney |
| 4,782,643 A | 11/1988 | Stark |
| 4,897,985 A | 2/1990 | Buchko et al. |
| 4,905,454 A | 3/1990 | Sanfilippo et al. |
| 4,909,022 A | 3/1990 | Kubis et al. |
| H762 H | 4/1990 | DeMasi et al. |
| 4,948,610 A | 8/1990 | Goglio |
| 4,996,824 A | 3/1991 | Torterotot |
| 5,001,878 A | 3/1991 | Sanfilippo et al. |
| 5,043,175 A | 8/1991 | Bayley et al. |
| 5,152,968 A | 10/1992 | Foti et al. |
| 5,155,974 A | 10/1992 | Garwood |
| 5,170,611 A | 12/1992 | Buchko et al. |
| 5,195,294 A | 3/1993 | Baranowski |
| 5,205,110 A | 4/1993 | Buchko |
| 5,269,216 A | 12/1993 | Corominas |
| 5,271,207 A | 12/1993 | Epstein et al. |
| 5,281,428 A | 1/1994 | Morgan |
| 5,298,270 A | 3/1994 | Morgan |
| 5,344,609 A | 9/1994 | Long |
| 5,356,649 A | 10/1994 | LaMotta et al. |
| 5,366,746 A | 11/1994 | Mendenhall |
| 5,374,437 A | 12/1994 | Lagares Corominas |
| 5,422,130 A | 6/1995 | Fox et al. |
| 5,443,150 A | 8/1995 | Buchko |
| 5,466,498 A | 11/1995 | Forloni et al. |
| 5,470,597 A | 11/1995 | Mendenhall |
| 5,512,312 A | 4/1996 | Forney et al. |
| 5,514,403 A | 5/1996 | Webb et al. |
| 5,524,419 A | 6/1996 | Shannon |
| 5,537,916 A | 7/1996 | Lagares-Corominas |
| 5,577,367 A | 11/1996 | Abrams et al. |
| 5,682,729 A | 11/1997 | Buchko |
| 5,711,981 A | 1/1998 | Wilson et al. |
| 5,718,101 A | 2/1998 | Noel et al. |
| 5,741,536 A | 4/1998 | Mauer et al. |
| 5,749,203 A | 5/1998 | McGowan, Jr. |
| 5,785,270 A | 7/1998 | Buchko |
| 5,816,024 A | 10/1998 | Sanfilippo et al. |
| 5,822,951 A | 10/1998 | Rosik |
| 5,834,049 A | 11/1998 | Kageyama |
| 5,932,265 A | 8/1999 | Morgan |
| 5,952,027 A | 9/1999 | Singh |
| 6,021,625 A | 2/2000 | Cerwin et al. |
| 6,085,490 A | 7/2000 | Buchko |
| 6,086,833 A * | 7/2000 | Conners et al. ............... 422/292 |
| 6,086,936 A | 7/2000 | Wilson et al. |
| 6,202,388 B1 | 3/2001 | Sanfilippo et al. |
| 6,245,294 B1 | 6/2001 | Goldberg et al. |
| 6,269,946 B1 | 8/2001 | Colombo |
| 6,291,003 B1 | 9/2001 | Riemann et al. |
| 6,350,482 B2 * | 2/2002 | Tottenham et al. ........... 426/233 |
| 6,622,457 B2 | 9/2003 | Kurth |
| 6,718,735 B2 | 4/2004 | Lewis et al. |
| 6,748,726 B2 | 6/2004 | Rossi et al. |
| 6,843,043 B2 | 1/2005 | Hanson et al. |
| 6,976,347 B2 | 12/2005 | Karman et al. |
| 7,247,330 B2 | 7/2007 | Kuethe et al. |
| 2002/0119073 A1 | 8/2002 | McGowan, Jr. et al. |
| 2004/0018283 A1 | 1/2004 | Hirschey et al. |
| 2004/0018284 A1 | 1/2004 | Kuethe et al. |
| 2005/0022468 A1 | 2/2005 | Hanson et al. |
| 2006/0029704 A1 | 2/2006 | Karman et al. |
| 2007/0172561 A1 | 7/2007 | Hirschey et al. |

FOREIGN PATENT DOCUMENTS

| | | |
|---|---|---|
| EP | 0261929 | 3/1998 |
| EP | 1407968 A1 | 4/2004 |
| EP | 1495977 A1 | 1/2005 |
| EP | 1495977 B1 | 6/2007 |
| JP | SHO 53-025189 | 3/1978 |
| JP | SHO 60-184809 | 12/1985 |
| JP | SHO 64-053074 | 3/1989 |
| JP | 09-058613 | 3/1997 |
| JP | HEI 10-099061 | 4/1998 |

OTHER PUBLICATIONS

Asselbergs, E.A. et al; *Studies on the Application of Infrared in Food Processing*; Plant Research Institute, Canada Department of Agriculture, Ottawa; 1960; pp. 449-453.

Ginzburg, A.S.; *Application of Infra-red Radiation in Food Processing*; Chemical and Process Engineering Series; C.R.C. Press—Cleveland; 1969; pp. 292-297.

Dagerskog, Magnus; *Infra-Red Radiation for Food Processing II. Calculation of Heat Penetration During Infra-Red Frying of Meat Products*; Lebensm.-Wiss. u.—Technol., 12; 1979; pp. 252-256.

Blankenship, L.C. et al; *Cooking Methods for Elimination of Salmonella typhimurium Experimental Surface Containment from Rare Dry-Roasted Beef Roasts*; Journal of Food Science, vol. 45 (1980); pp. 270-272.

Sandu, Constantine; *Infrared Radiative Drying in Food Engineering: A Process Analysis*; Department of Food Science, University of Wisconsin-Madison, Madison, Wisconsin; Biotechnology Progress (vol. 2, No. 3); Sep. 1986; pp. 109-119.

Hallstrom, Bengt et al; *Heat Transfer and Food Products*; Elsevier Science; New York, New York, 1988; pp. 214-231.

*Radiant Wall Oven Applications*; Pyramid Manufacturing, 1996.

Hanson, Robert E.; *Reducing Process Variation in the Cooking and Smoking Process*; Processing Technologies; American Meat Science Association; 50th Annual Reciprocal Meat Conference; 1997; pp. 33-42.

*Browning in Traditional Continuous Ovens Up and Down or Sideways Only?*; Unitherm Food Systems, Inc.; Unitherm Bulletin; Jul. 16, 1997.

Islam, MD. Mahbulbul; *Shelf Life Extension and Pathogen Reduction of Fresh Chicken Through Surface Pasteurization Using Radiant Heat and Anti-Microbial Agents*; UMI Dissertation Services, A Bell & Howell Information Company; 1998; pp. 1-139.

Shackelford, S.D. et al; *Effects of Blade Tenderization, Vacuum Massage Time and Salt Level on Chemical, Textural and Sensory Characteristics of Precooked Chuck Roasts*; Journal of Food Science, vol. 54, No. 4, 1989; pp. 843-905.

Hardin, Margaret D. et al; *Survival of Listeria monocytogenes in Postpasteurized Precooked Beef Roasts*; Journal of Food Protection, vol. 56, Aug. 1993; pp. 655-659.

Cooksey, D. Kay et al; *Reduction of Listeria monocytogenes in Precooked Vacuum-Packaged Beef Using Postpackaging Pasteurization*; Journal of Food Protection; vol. 56; Dec. 1993; pp. 1034-1038.

Shaw, Robert; *Extending the Shelf-Life of Chilled Ready Meals*; Meat Quality and Meat Packaging; 1998; pp. 359-367.

Rhodehamel, E. Jeffery et al; *Post Processing Pasteurization of Processed Meats*, American Meat Science Association; Annual Reciprocal Meat Conference; vol. 52; Jun. 23, 1999; pp. 113-114.

*Proceedings of the 1993 Food Preservation 2000 Conference*; Science and Technology Corporation; Oct. 19-21, 1993; Natick, Massachusetts; pp. 512-520.

Leistner, Lothar et al; *Food Preservation by Hurdle Technology*; Elsevier Science Ltd.; Trends in Food Science & Technology; Feb. 1995 (vol. 6); pp. 41-46.

Gould, G.W.; *New Methods of Food Preservation*; Blackie Academic & Professional; 1995.

Marth, Elmer H.; *Extended Shelf Life Refrigerated Foods: Microbiological Quality and Safety*; FoodTechnology; Scientific Status Summary; vol. 52, No. 2; Feb. 1998; pp. 57-62.

Leistner, Lothar; *Combined Methods for Food Preservation*; Handbook of Food Preservation; Marcel Dekker, Inc.; New York, New York, 1999; pp. 457-484.

Leistner, Lothar; *Basic Aspects of Food Preservation by Hurdle Technology*; Elsevier Science.; International Journal of Food Microbiology 55; 2000; pp. 181-186.

AMI Annual Convention; *Update: Post-Process Surface Pasteurization of Ready-to-Eat Meats*; Oct. 24-26, 2002; New Orleans, LA.

Delaquis, P.J. et al; *Microbiological Stability of Pasteurized Ham Subjected to a Secondary Treatment in Retort Pouches*; Journal of Food Protection; vol. 49; Jan. 1986; pp. 42-46.

Mulder, R.W.A.W. et al; *The Microbiological Shelf Life of Vacuum Packed Broiled Chickens*; Archiv for Lebensmittelhygiene; (5); May 31, 1999; pp. 108-111.

McGuckian, Col. Ambrose T.; *The A.G.S. Food System—Chilled Pasteurized Food*; May 1969; pp. 87-99.

Stanek, T.G.; *Precooked Pork Loin For Further Process*; Cryovac memo; Feb. 17, 1986.

Albertsen, Soren; *Alkar Sales Activity Report*; Jun. 16, 1999.

Cargill, *Product Specification for Riverside Smoked Deli*; Jun. 26, 1992.

UNITHERM, *Pasteurizing protection*, showing public use in 1997 at Plainville Farms, Plainville, NY.

Hanson, *Brine Chilling of Roasted Pork and Poultry Products for Bil Mar Foods*; Dec. 14, 1995.

Alkar, *Bil Mar Zeeland, MI Serpentine Chiller Plant Layout*, Mar. 4, 1996.

Hanson, *Post packaging pasteurization*; Alkar memo to Bil Mar; Jun. 25, 1998.

Bil Mar, *Food Service Brochure for Sara Lee Turkey products*; Dec. 29, 1998.

Bil Mar, *Food Service Priority List by SKU for Post Pasteurization of Key Products*; Dec. 29, 1998.

Bil Mar, *Surface Thermal Processing Product List*; Jan. 7, 1999.

Wasson, *Alkar Sales Activity Report re Bil Mar Zeeland, MI plant*; Jan. 7, 1999.

Betley, *Alkar Pasteurization Tests for Bil Mar Foods*; Jan. 20, 1999.

Wasson, *Alkar Sales Activity Report re Bil Mar Zeeland, Ml plant*; Feb. 19, 1999.

Alkar, *"Revised" Proposal, 1 of 3, One (1) Field Erected Continuous Vertical Serpentine Hot Water Pasteurization Zone to be Added to the One (1) Field Erected Continuous Vertical Serpentine Brine Chiller (Ref. JT 3067) that is at Alkar's Plant in Lodi, Wisconsin*; Jun. 3, 1999.

Bil Mar, *Purchase Order for Serpentine Hot Water Pasteurization Zone for Bil Mar Zeeland, MI*; Jun. 4, 1999.

Alkar, *Bil Mar Zeeland Pasteurizer/Chiller Plant Layout*; Jul. 12, 1999.

Specialized Patent Services, U.S. Trademark Application for *Stamp Design*; Serial No. 75/655508; dated Mar. 8, 1999.

UNITHERM, *Smoking and Browning under 10 minutes!*; advertisement; Meat & Poultry magazine; Apr. 28, 1998.

Canadian Institute of Food Science and Technology, *Applied Technology, Food Preservation by Combined Methods*, Food Research International 25 (1992) 151-158.

Morgan, Arthur I. et al; *Surface Pasteurization of Raw Poultry Meat by Steam*; U.S. Department of Agriculture Research, Agriculture Research Service, Eastern Regional Research Center (Received May 15, 1995; accepted Sep. 21, 1996); 199th Academic Press Limited.

Morgan, Arthur I., et al; *Ultra High Temperature, Ultra Short Time Surface Pasteurization of Meat*; Journal of Food Science—vol. 61, No. 6, 1996 (pp. 1216-1218).

Kozempel, Michael, et al; *Application of the vacuum/steam/vacuum surface intervention process to reduce bacteria on the surface of fruits and vegetables*; Innovative Food Science & Emerging Technologies 3 (2002) 63-72; US Department of Agriculture, Agricultural Research Service, Eastern Regional Research Center, Engineering Science Research Unit; Accepted Jan. 6, 2002; 2002 Elsevier Science Ltd.; pp. 63-72.

Kozempel, Michael, et al; Journal of Food Protection, vol. 63, No. 4, 2000, pp. 457-461; *Rapid Hot Dog Surface Pasteurization Using Cycles of Vacuum and Steam to Kill Listeria innocua*; U.S. Department of Agriculture, Agricultural Research Service, Eastern Regional Research Center; Engineering Science Research Unit; MS 99-252; Received Aug. 27, 1999/Accepted Nov. 5, 1999; pp. 457-461.

*Steam Surface Pasteurization of Beef Frankfurters*; M. Cygnarowicz-Provost, R. C. Whiting and J.C. Craig, Jr.; Journal of Food Science—vol. 59, No. 1, 1994, pp. 1-5.

Office Action for corresponding Australian Patent Application No. 2003227294 dated May 9, 2008.

\* cited by examiner

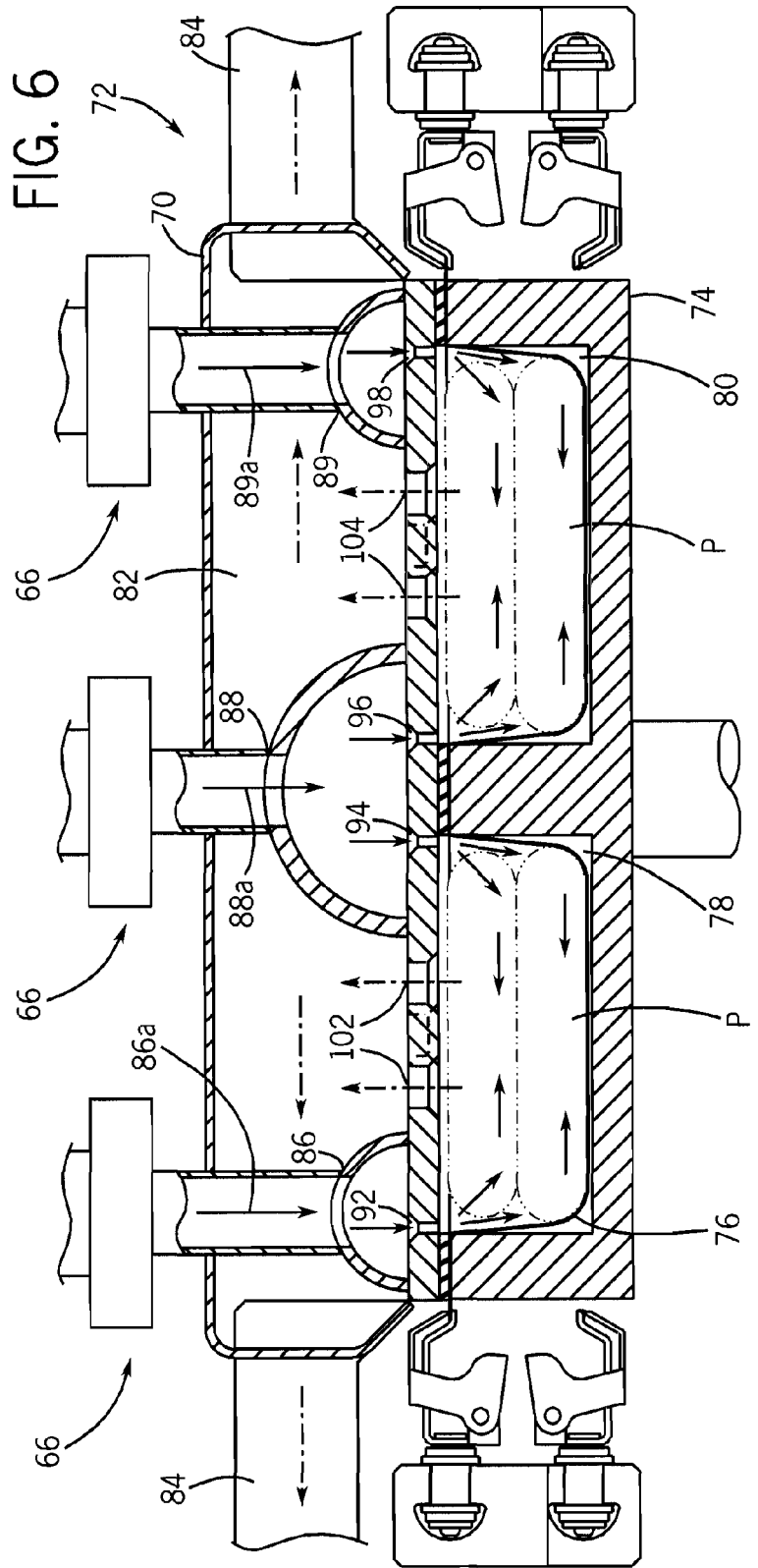

ANTI-MICROBIAL INJECTION FOR WEB PACKAGING PASTEURIZATION SYSTEM

BACKGROUND

The present application is directed to improved methods and systems for controlling contamination in a web packaging system. The methods and systems described herein maintain food quality and reduce the risk to the public from food-borne pathogens.

Food-borne pathogens are a major concern for our society. Publicity surrounding high-profile food poisoning incidents subjects both government agencies and industries to external pressures to identify and control potential hazards caused by microbial contamination.

Although generally preventable, food-borne illness remains a serious problem in the United States. Contaminated food has been estimated to cause 76 million illnesses in the United States each year, including 325,000 cases resulting in hospitalization. The Council for Agricultural Science and Technology has estimated that food-borne diseases caused by the most common bacterial pathogens found in ready-to-eat (RTE) foods—listeria monocytogens, *Campylobacter Jejuni, Escherichia coli, Salmonella* and *Staphylococcus Aureus*— may cause as many as 9,000 deaths each year. The present application discloses methods and systems that will benefit public health by eliminating or reducing food-borne pathogens from RTE foods.

The United States Department of Agricultural Food Safety and Inspection Service (USDA-FSIS) has established three alternative means for regulating RTE meat and poultry products that are exposed to the environment after cooking. The first alternative uses a post-lethality (post-cooking) treatment that reduces or eliminates bacterial pathogens and subsequently applies an antimicrobial agent or process that suppresses or limits bacterial pathogen growth throughout the product's shelf life. In the second alternative, the RTE product is subjected to a post-cook lethality treatment or is formulated with antimicrobial ingredients. Finally, the third alternative relies solely on good manufacturing practices and sanitation programs to control common bacterial pathogens.

Researchers and processors have been working for years on developing and implementing post-cook (post-process) lethality treatments for at-risk RTE meats, such as frankfurters or wieners. The industry has options for both pre- and post-packaging lethal treatments, including steam, hot water, radiant heat, and high-pressure processing. Application of steam surface pasteurization and vacuum packaging systems allow post-process lethality treatments to be achieved at a production line speed that is comparable to that of commercial packaging for RTE foods.

Web packaging machines and methods are known in the prior art. For example, the apparatus described in U.S. Pat. No. 6,843,043 packages a food product between upper and lower webs. A web transport conveyor transports the lower web through a series of stations, which form the lower web into a component of a package at a forming station, and receive the food product at a loading station, and close the package with the upper web at a closing station. A pasteurization station is located between the loading station and the closing station and pasteurizes the food product in a simple, effective manner readily and seamlessly incorporated into the packaging line.

U.S. Pat. No. 7,247,330 teaches the combined treatment of vacuum-sealed food products by a thermal surface treatment and application of one or more antimicrobial agents to the surface of the food products. Thermal surface treatment is provided as a first treatment step followed immediately by the application of one or more antimicrobial agents as a second, separate treatment step. A drying step is preferably conducted between the thermal surface treatment and application of antimicrobial agents.

There remains a need for more efficient, more effective, and simplified methods and systems for treating the surface of a food product to kill and/or significantly reduce the growth of food-borne pathogens without subjecting the food product to overly high temperatures for relatively long periods of time.

SUMMARY

The present application describes improved systems and methods for controlling contamination of food product. A pressurized mixture of pasteurizing media, preferably heated steam, and at least one antimicrobial agent is applied, preferably sprayed, onto the surfaces of a food product. According to a preferred embodiment, the at least one microbial agent is injected into and thereby mixed with a pressurized supply of pasteurizing steam prior to its discharge into a pressurized chamber and application to the food surfaces. Preferably, the mixture is introduced into the pressurized chamber at an inflow rate and vented from the chamber at an outflow rate that is slower than the inflow rate such that the pressure in the chamber increases to increase the temperature of the mixture to an effective temperature for killing bacteria.

BRIEF DESCRIPTION OF THE DRAWINGS

The best mode of carrying out the claimed invention is described herein with reference to the following drawing figures.

FIG. 6 is a view of section 6-6 taken in FIG. 4.

DETAILED DESCRIPTION

Figure 1:
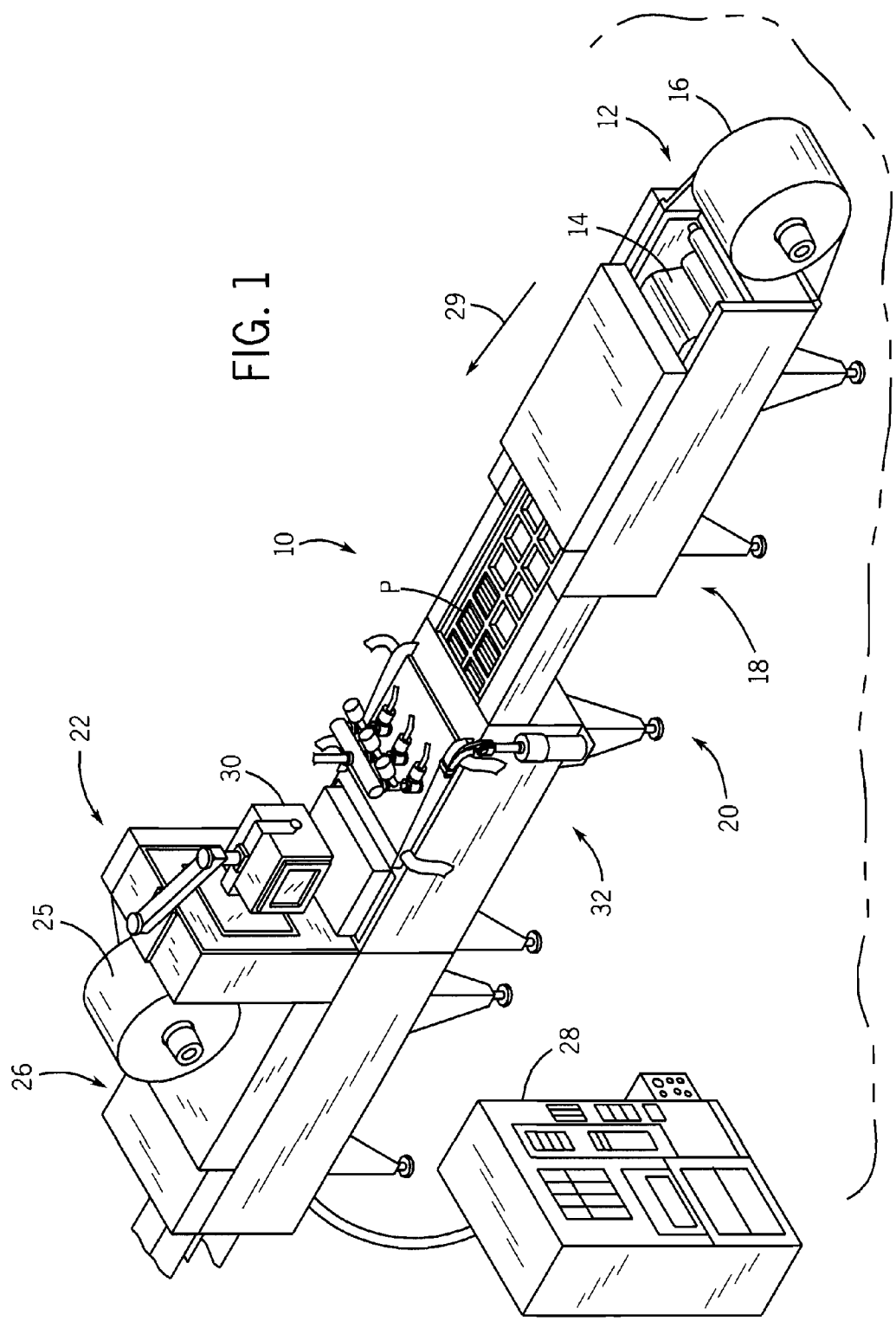
FIG. 1 is an isometric view of a web packaging apparatus.

FIG. 1 illustrates a packaging machine 10 that generally includes a lower web supply station 12 for supplying a lower web 14 of flexible packaging material from a supply roll 16, a forming station 18, a loading station 20, an upper web supply station 22 for supplying an upper web of flexible packaging material 25, and a downstream station 26 closing the package. The web transport conveyor provided by machine 10 transports lower web 14 through the noted series of stations which form the lower web 14 into a component of a package at forming station 18, and receive a food product such as hot dogs P at loading station 20, and close the package with the upper web 25 at closing station 26. The upper and lower webs 14, 25 are advanced by an indexing apparatus (not shown) which is controlled by control modules 28, 30. The conveyor advances from upstream to downstream, as shown by arrow 29, wherein closing station 26 is downstream of loading station 20, and loading station 20 is downstream of forming station 18.

Figure 2:
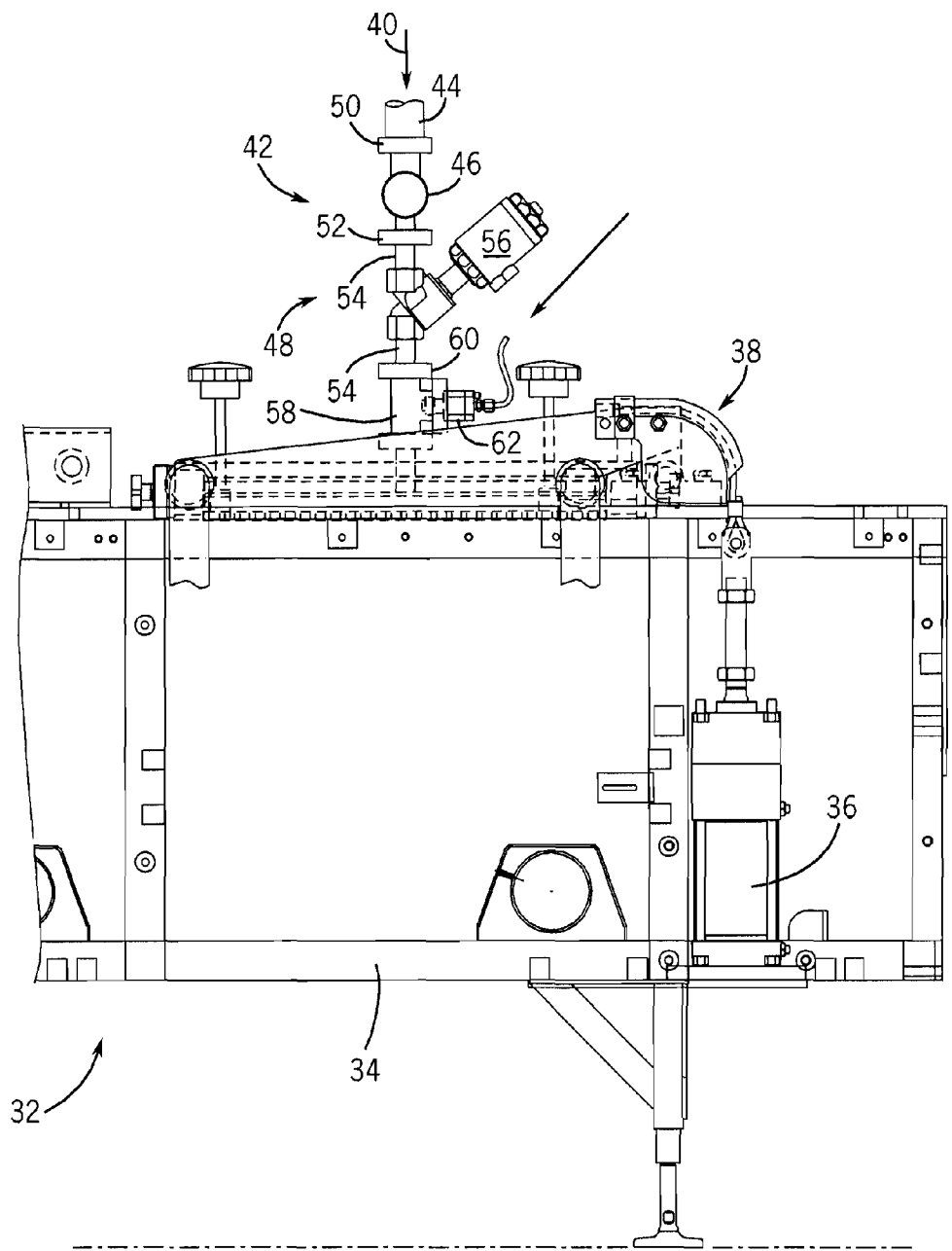
FIG. 2 is a side view partially cut away of a portion of the apparatus of FIG. 1.
Figure 3:
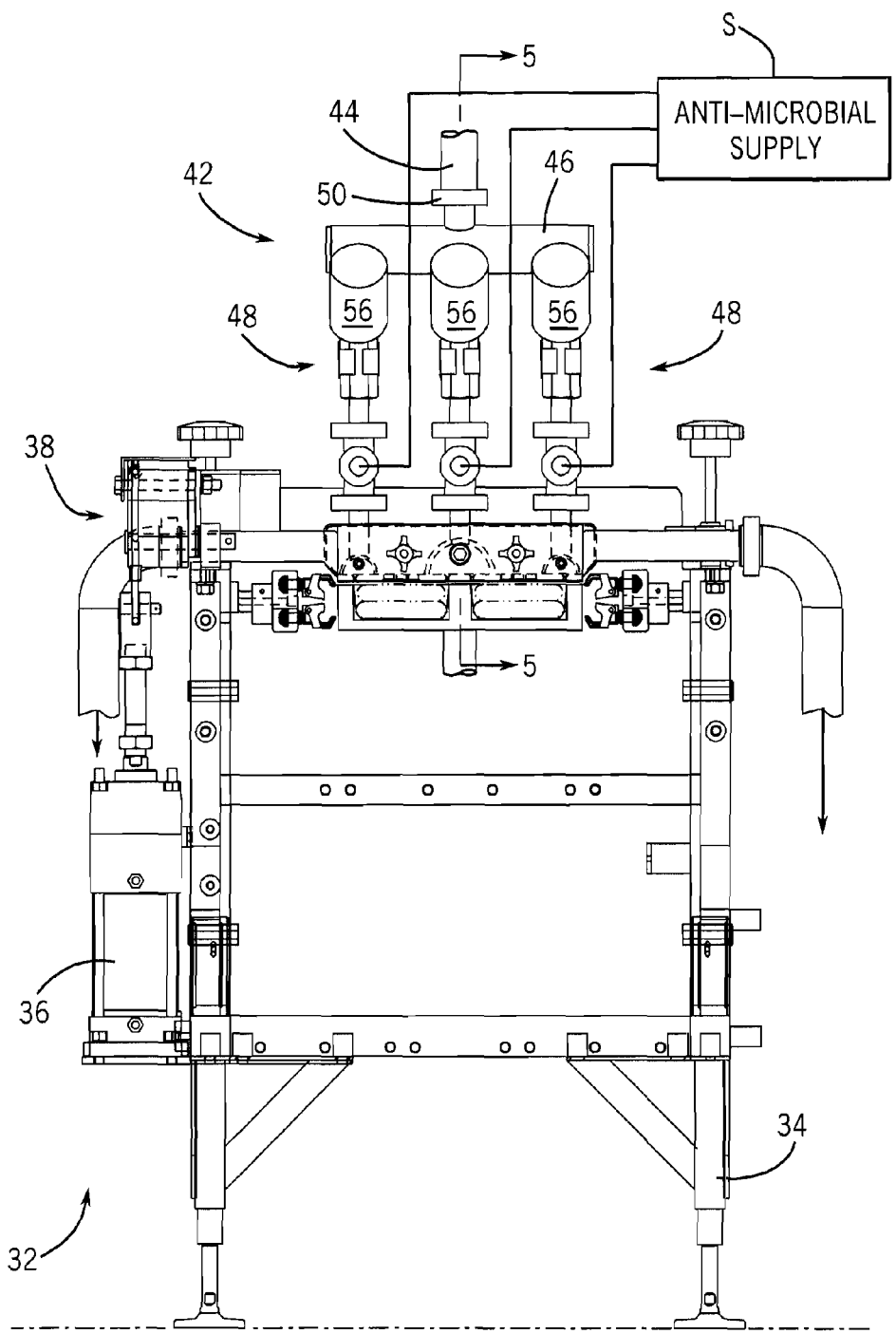
FIG. 3 is an end view of the portion shown in FIG. 2.

A pasteurization station 32 is located between loading station 20 and closing station 26 and specifically downstream of loading station 20 and upstream of closing station 26. As shown in FIG. 2, the pasteurization station 32 is supported by a frame 34 and includes a pressure tank 36 that facilitates a hydraulic lift mechanism 38, the purpose of which will be explained further below. Pasteurization station 32 receives a pressurized supply of pasteurizing media 40, which in the preferred embodiment comprises heated steam. The supply of pasteurizing steam 40 is introduced via a piping assembly 42 that comprises a series of tubes, clamps, gaskets, adapters, etc. As shown in FIGS. 2 and 3, jacketed header supply tube 44 deposits the supply of pasteurizing steam 40 into manifold 46, which then distributes the pasteurizing steam 40 into three separate distribution pipes 48. The jacketed header supply tube 44 is attached to the manifold 46 via a clamp and gasket connection 50. In turn, the manifold 46 is connected to the distribution pipes 48 via clamp and gasket connection 52. Each distribution pipe 48 includes opposing adapters 54 connecting a valve piston 56 to a pneumatic tee 58. The adapters 54 and pneumatic tee 58 are connected by a clamp and gasket connection 60.

Figure 5:
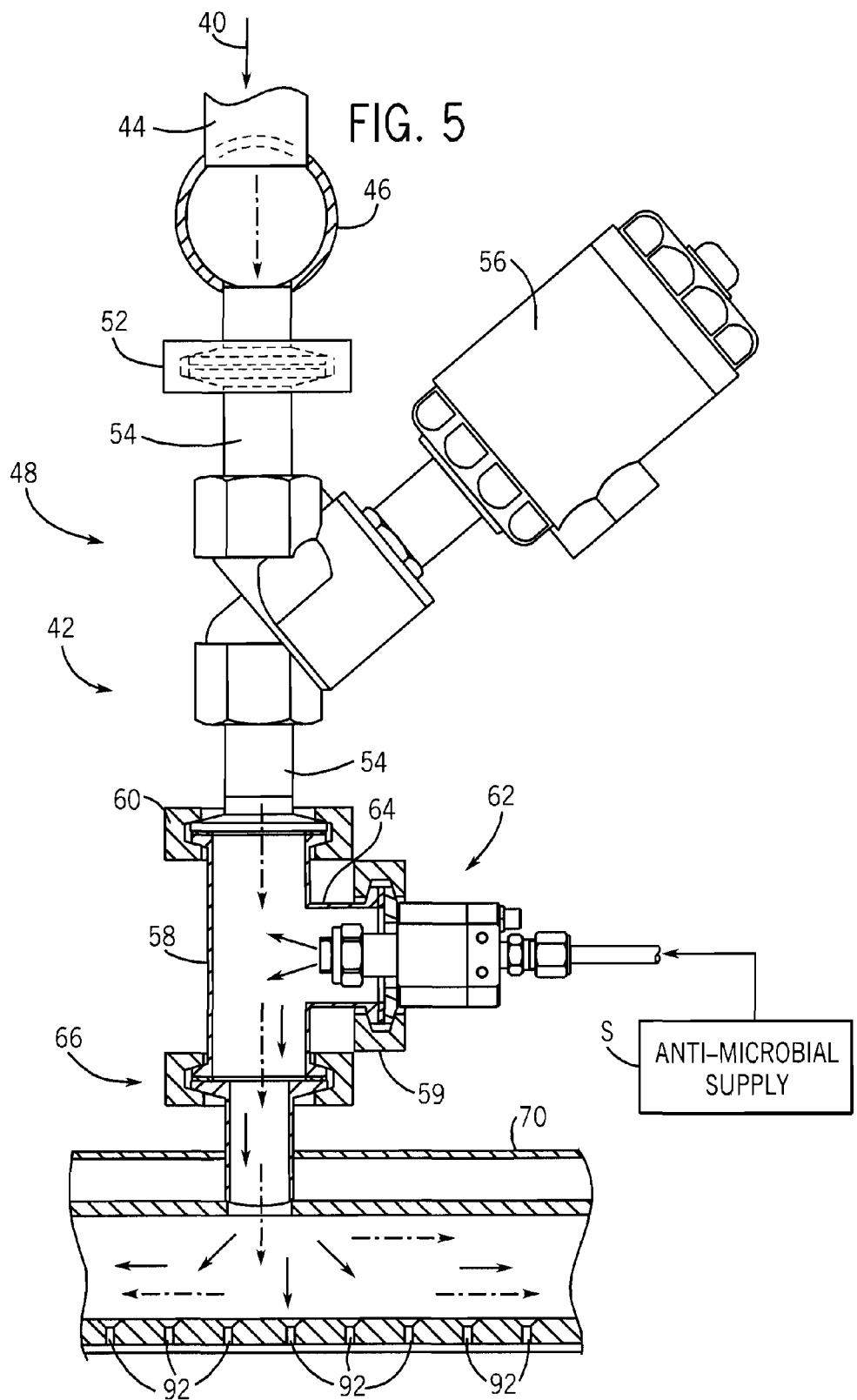
FIG. 5 is a view of section 5-5 taken in FIG. 3.

As shown in FIG. 5, an antimicrobial injector 62 is connected to the transverse arm 64 of the tee 58 and receives and deposits a supply of antimicrobial agent (S) into the tee 58. The injector 62 can consist of a solenoid activated automatic spray nozzle that is specifically designed for fast on-off operation. One example of such an injector is the PulsaJet 10000 manufactured by Spraying Systems Co., however any suitable injector will suffice. The injector 62 is connected to the tee 58 by a manually removable clamp 59, which provides a modular design that, in use, can be easily fitted and retrofitted to adapt to a variety of adapters. The clamp 59 also advantageously allows for quick and easy removal, repair and/or replacement of the injector 62.

The antimicrobial agents (S) can contain one or more antimicrobial agents that can include any effective food-grade antimicrobial compound. Suitable agents known and described in the art include antibacterial agents (also referred to as bactericidal agents) which are effective to kill or inhibit bacteria (e.g., antibiotics such as nisin, nisin-containing whey, natamycin, subtilin) or *Pediococcus*-derived bacteriocins (e.g., pediocin); food-grade acids and salts of food-grade acids (e.g., acetic acid, lactic acid, malic acid, phosphoric acid, sorbic acid, benzoic acid, mixtures thereof, and the like); heat resistant antibacterial enzymes such as lysozyme; spice extracts having antibacterial properties; plant extracts having antibacterial properties (e.g., hop extracts; rosemary extracts, rosemary extract acids such as rosmarinic acid and carnosic acid); inorganic salts having antibacterial properties (e.g., acidified calcium sulfate); and other agents such as liquid smoke, parabens, or ozone; mixtures of such agents can also be used. The antimicrobial agent can be selected from food-grade acids and their salts, bacteriocins, spice extracts, plant extracts, nisin, hops acid extracts, tertiary butylhydroquinone, cetyl pyridium chloride, and mixtures thereof.

The lower end 66 of the each tee 58 is connected to a respective flow passage in an upper member 70 of pasteurization deck 72. As shown in FIG. 6, pasteurization deck 72 includes the upper member 70 and a lower member 74, which are operable to sandwich and seal lower web 14 therebetween. In the illustrated embodiment, lower member 74 includes a plurality of aligned side-by-side compartments 78, 80, which are pressure sealed when the upper member 70 and lower member 74 are in the closed position, shown in FIG. 6. Upper member 70 includes an outlet manifold 82 connected to exhaust pathways 84 and further includes the aforementioned three inlet flow passages 86, 88, 89 which, respectively, are in fluid communication with the distribution pipes 48. Upper member 70 of pasteurization deck 72 further includes a series of sets of inlet ports, including inlet ports 92, inlet ports 94, inlet ports 96, and inlet ports 98. Inlet ports 92 are in fluid communication with inlet passage 86 and compartment 78. Inlet ports 94 and 96 are in fluid communication with inlet passage 88 and inlet ports 94 are in fluid communication with compartment 78 and inlet ports 96 are in fluid communication with compartment 80. Inlet ports 98 are in fluid communication with inlet passage 90 and compartment 80.

Figure 4:
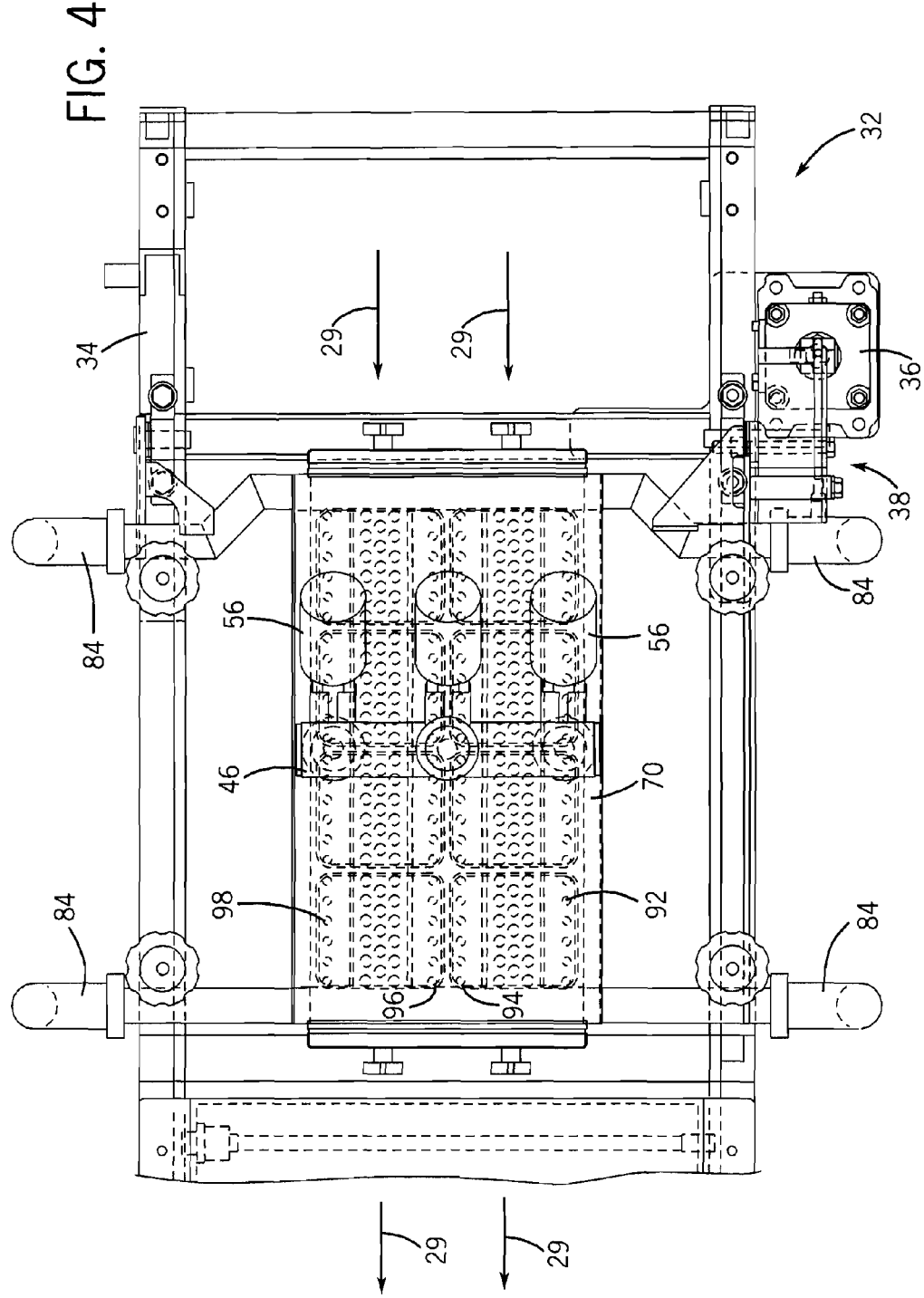
FIG. 4 is a top view of the portion shown in FIG. 2.

During operation, indexing apparatus indexes the conveyor from upstream to downstream in the direction shown by arrow 29. After the lower web 14 is formed into the shape of compartments 78, 80 at the forming station 18, it is indexed into position between the upper member 70 and lower member 74 of pasteurization deck 72. In the preferred embodiment, the pasteurization deck 72 is wide enough to accept and treat numerous compartments 78, 80 formed in the lower web 76 in a single indexing step, as shown in FIG. 4. In this embodiment, a plurality of aligned compartments 78, 80, respectively, are simultaneously indexed to a position that is between the upper member 70 and lower member 74 of pasteurization deck 72. Once the plurality of compartments 78, 80 is indexed into position, controller 28 actuates hydraulic lift mechanism 38 to drive lower member 74 upwardly and into contact with the upper member 70. Thus, the lower web 76 is sandwiched between the lower member 74 and upper member 70 of the pasteurization deck 72, as shown in FIG. 6.

Prior to, or simultaneously with the sandwiching of the upper member 70 and lower member 74, control module 28 actuates injector 62 to inject a predetermined volume of antimicrobial agent(s) into tee 58 of piping assembly 42. Simultaneously, or immediately subsequent to the injection of antimicrobial media into tee 58, controller 28 causes a supply of pasteurizing steam to flow through piping assembly 42, through manifold 46 and the respective distribution pipes 48, and into the respective inlet passages 86, 88, 89, as shown by arrows 86a, 88a, and 89a respectively. Preferably the supply comprises a short burst of steam having a predetermined volume. As the pasteurizing steam passes through the tee 58, it is mixed with the antimicrobial agent injected by the injector 62 and carries the antimicrobial agent into into the respective compartments 78, 80 via the inlet passages 86, 88, 89. More specifically, the pressurized mixture flows from inlet passage 86 flows through inlet port 92 and into compartment 78. The pressurized mixture flows from inlet passage 88, through inlet ports 94 and 96, and is then dispersed into respective compartments 78, 80 and onto the food product. The pressurized mixture flows from inlet passage 90 onto inlet ports 98 and into the respective compartments 80. In the compartments 78, 80, the mixture flows across the surfaces of the food product and exits the respective compartments via outlet ports 102, 104 and into the outlet manifold 82, which leads to exhaust pathways 84. Lastly, the controller 28 actuates the pressure tank 36 and hydraulic lift mechanism 38 to lower the lower member 74 and separate the lower member 74 from the upper member 70. The indexing apparatus indexes the plurality of treated compartments 78, 80 out of position between the lower member 74 and upper member 70 and, in turn, indexes a new plurality of compartments therebetween. The treated compartments 78, 80 are indexed downstream for further processing, as described above.

The apparatus and methods disclosed herein are especially useful for packaging wieners or similar type processed meat food products. Mixing of the pressurized supply of pasteurization medium and the injected antimicrobial agents prior to introduction into the chamber provides significant improvements over the prior art, including improved efficiency and improved bacteriostatic protection. Injection of the antimicrobial agents into the pressurized supply of pasteurization medium, and subsequent injection of the mixture into a chamber containing the food product surprisingly results in an even and thorough application of antimicrobial agent onto the surfaces of the food product. This is highly advantageous because it provides long-lasting, effective bacteriostatic protection within the sealed package, which helps increase the shelf life of the packaged food product. Rapid and effective coating of the entire surface of the food product is ensured by the high pressure supply and therefore the food products can be treated without the need for a vacuum/drying step and without much concern regarding specific flow patterns of the mixture within the chamber. This results in a much simpler apparatus for treatment of food borne pathogens and a much more timely treatment station, enhances production line speed and can be more easily incorporated into the overall packaging system.

It should be understood that the drawings and specification are to be considered an exemplification of the principles of the invention, which is more particularly defined in the appended claims. The term pasteurization is used herein in accordance with its normal dictionary definition, including partial sterilization of a substance at a temperature and for a period of exposure that destroys objectionable organisms without major chemical alteration of the substance, and including destruction of pathogenic and/or spoilage organisms for extending shelf life. The pasteurizing medium is preferably steam, or alternatively hot air or superheated steam, though other types of pasteurizing media may be used. The invention may be used with various web packaging apparatus known in the art, including continuous motion type web packaging machines and indexing type web packaging machines. It is preferred that plural packages of food product be simultaneously processed at the pasteurization station, though the invention is not limited to any number, i.e., the invention includes the pasteurization of one or more product packages. Furthermore, additional pasteurization stations may be added, and the invention includes one or more pasteurization stations, each having one or more pasteurization chambers.

What is claimed is:

1. A method of processing food product comprising:
    indexing a web of packaging material into a forming station that forms the web into a component portion of a package for receiving food product;
    indexing the component portion into a loading station that loads food product into the component portion;
    indexing the component portion into a pasteurizing station;
    sandwiching the component portion between upper and lower members in the pasteurizing station, wherein the upper and lower members come together to form a pressurized chamber connected to a piping assembly comprising a tee having first and second inlets and having an outlet connected to the pressurized chamber;
    operating an injector to spray antimicrobial agent into the tee via the first inlet prior to or simultaneously with the sandwiching by the upper and lower members;
    supplying a burst of pasteurizing medium into the tee via the second inlet simultaneously with or immediately subsequent to operating the injector to spray the antimicrobial agent into the tee, such that as burst of pasteurizing medium is supplied to the tee the pasteurizing medium mixes with the antimicrobial agent in the tee to form a mixture; and
    thereafter discharging the mixture into the pressurized chamber such that the mixture flows across said food product from the one or more inlet ports to the one or more outlet ports.

2. A method according to claim 1, comprising discharging the mixture into the chamber at an inflow rate and venting the mixture from the chamber at an outflow rate that is slower than the inflow rate such that pressure in the chamber increases to a point where the temperature of the mixture is increased to an effective temperature for killing bacteria.

3. A method according to claim 1, comprising separating the upper and lower members and then indexing the component portion out of the pasteurizing station and simultaneously indexing a new component portion of a package into the pasteurizing station.

4. A method according to claim 1, wherein the pasteurizing medium comprises steam.

5. A method according to claim 1, comprising providing a plurality of injectors for injecting antimicrobial agent, wherein the piping assembly comprises a plurality of tees receiving the antimicrobial agent, and operating the plurality of injectors to inject the antimicrobial agent into the plurality of tees, mixing the of antimicrobial agent and the pasteurizing medium in the tees, and then discharging the mixture from the piping assembly to the chamber.

* * * * *